Dec. 15, 1953     R. H. GREEN     2,662,962
SUPPORT FOR ELECTRICALLY HEATED TOOLS
Filed Nov. 2, 1950     2 Sheets-Sheet 1
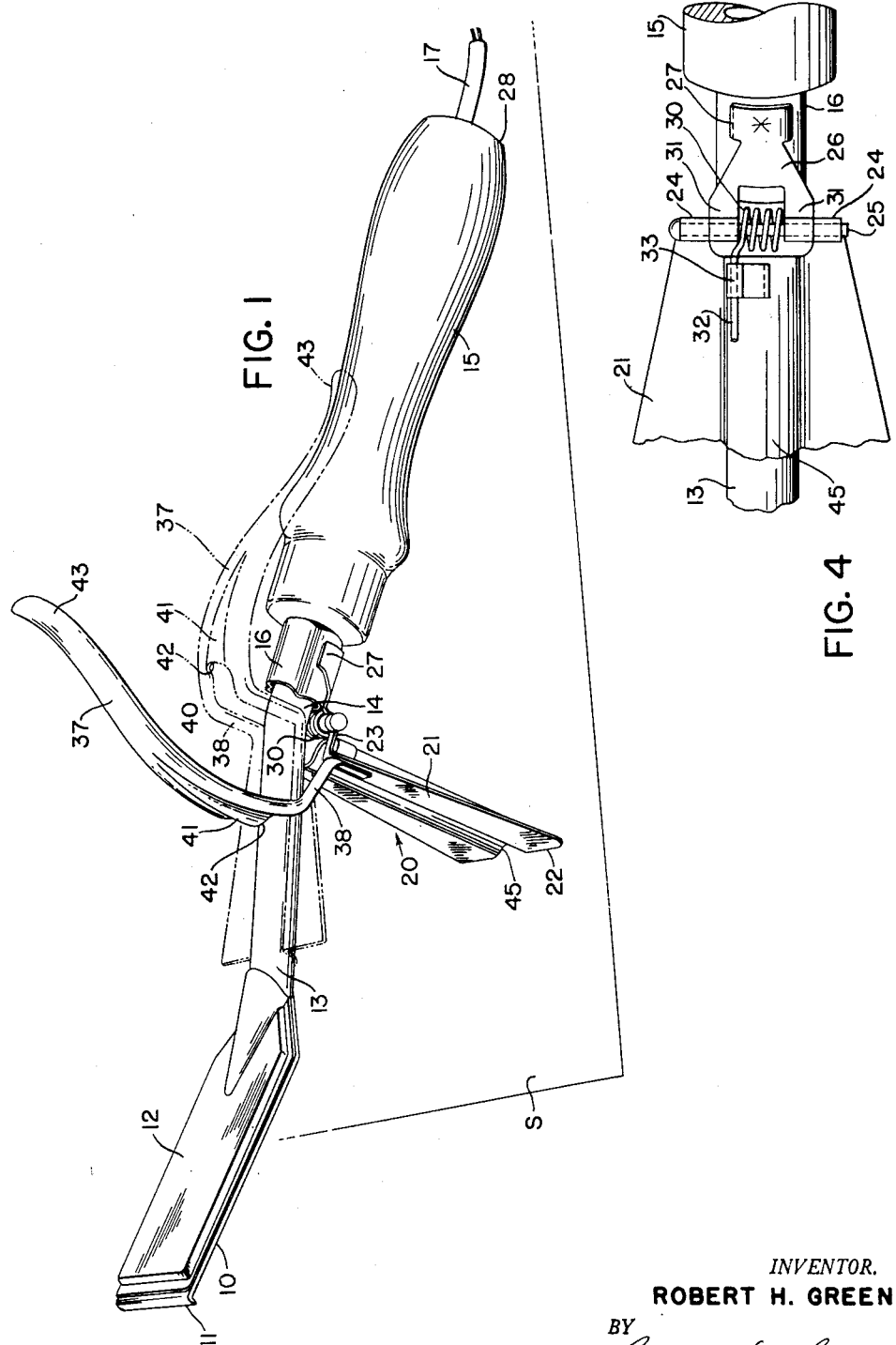
*INVENTOR.*
ROBERT H. GREEN
BY
*Bosworth + Sessions*
ATTORNEYS Dec. 15, 1953 R. H. GREEN 2,662,962
SUPPORT FOR ELECTRICALLY HEATED TOOLS
Filed Nov. 2, 1950 2 Sheets-Sheet 2
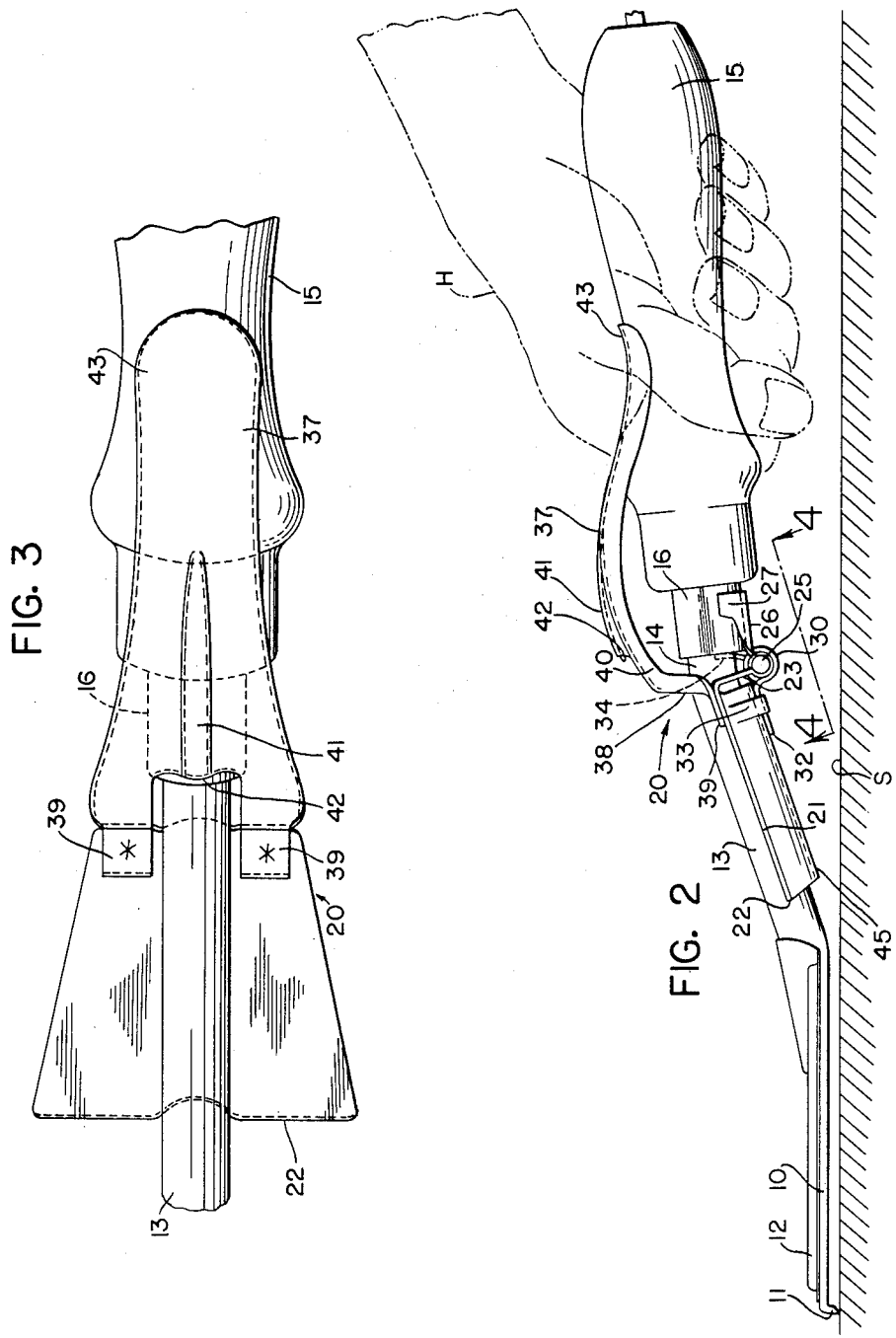
INVENTOR.
ROBERT H. GREEN
BY
Bosworth & Sessions
ATTORNEYS Patented Dec. 15, 1953

2,662,962

UNITED STATES PATENT OFFICE 2,662,962

SUPPORT FOR ELECTRICALLY HEATED TOOLS

Robert H. Green, Rocky River, Ohio, assignor, by mesne assignments, to The Otto Konigslow Mfg. Co., Cleveland, Ohio, a corporation of Ohio Application November 2, 1950, Serial No. 193,724

9 Claims. (Cl. 219—21)

This invention relates to heated tools and more particularly to a rest or stand adapted to hold the heated portion of an electrically heated tool out of contact with a supporting surface whenever the tool is not in use. The invention is described herein as it is applied to an electrically heated paint removing tool of the type described and claimed in my compending application Serial No. 135,127 filed December 27, 1949, Patent No. 2,613,310, but it is to be understood that the invention may be adapted to other types of electrically heated tools such as electrically heated soldering irons and the like.

A general object of the invention is the provision of a simple, foolproof rest or stand for electrically heated hand tools which will automatically raise and hold the heated portion of the tool out of contact with the surface on which the tool is supported whenever the tool is not in use. Another object is the provision of such a stand which will not interfere with the normal use of the tool. A further object is the provision of such a stand which can be economically manufactured and readily adapted to tools of existing types.

Further objects and advantages of the invention will become apparent from the following description of a preferred form thereof, reference being made to the accompanying drawings in which Figure 1 is a perspective view showing a paint removing tool provided with my stand, the stand being shown in full lines in open or supporting position; Figure 2 is a side elevation view of the tool shown in Figure 1 with the stand shown in closed position, which it takes when the tool is in use; Figure 3 is a fragmentary plan view on an enlarged scale showing the stand of Figures 1 and 2; and Figure 4 is a fragmentary view of the underside of the tool of Figures 1 and 2 with the stand in closed position, the view taken as indicated by the line 4—4 of Figure 2.

In the drawings, the invention is shown as adapted to an electrically heated paint removing tool made according to my aforesaid application. Such a tool, in its preferred form, comprises a flat blade portion 10 having a downwardly and forwardly extending scraping edge 11, the blade being heated by means of an electrically heated resistance element disposed within the housing 12 on the upper side of the blade to a temperature sufficient to soften paint by heat radiated from the blade. The blade is supported by a tubular shank 13 terminating in a handle supporting portion 14 to which a handle 15 composed of wood or other heat insulating material is secured, preferably through a metal insert 16 which grips the handle supporting portion 14 of the shank and is inserted into a recess in the end of the handle 15. The insert functions to protect the handle from the heat of the shank and is preferably made in accordance with the disclosure of my copending application Serial No. 181,533 filed August 25, 1950, now abandoned. Conductor 17 extends through an opening in the handle and through the shank 13 to supply electricity to the heating element.

In order to provide means adapted automatically to raise the heated blade 10 from a supporting surface whenever the tool is laid aside by the user I preferably employed the stand indicated in general at 20. The stand comprises a pressed metal support 21 which is preferably tapered as shown in Figure 3 and which terminates in a lower end 22 adapted to rest on a supporting surface S when the tool is not in use. At its upper end, the support 21 is provided with legs 23 which extend substantially at right angles to the support 21 and are bent into end loops as shown particularly in Figures 2 and 4 to provide hinge members 24 which engage the hinge pin 25. Pin 25 is supported in turn by hinge bracket 26 which has a base portion 27 curved to fit the insert 16 and which is preferably spot welded thereto as indicated diagrammatically in Figure 4. Thus the support 21 is pivotally mounted beneath the tool, the location of the pivot and the open position of the support being selected so that when the support is in open or supporting position the weight of the tool on the handle side of the line of engagement of the end 22 of the support 21 with the supporting surface S will overbalance the remainder of the tool; the tool, therefore, will take a position such as shown in Figure 1, with the heated blade raised well above the surface S, and the end 28 of the handle resting on surface S.

In order to urge the support 21 into open or supporting position as shown in full lines in Figure 1, a spring 30 is provided. The spring is disposed between the spaced leg portions 31 of the hinge bracket 26 (see Figure 4) and the end 32 thereof is clamped beneath a tang 33 struck up from the upper portion of the support 21. The other end 34 of spring 30 engages the end of the insert 16 (see Figure 2); the spring acts between the tang 33 and the end of insert 16 to urge the support 21 toward open position, tending to rotate the support about the pivot provided by the hinge pin 25. Thus, unless it is restrained, the support 21 will always take the position shown in Figure 1 and the spring has sufficient strength to lift the blade 12 of the tool into the position shown in Figure 1.

In order to move the support 21 from the open or supporting position shown in full lines in Figure 1 to the closed or working position shown in broken lines in Figure 1 and in full lines in Figure 2 and to retain it in closed position while the tool is in use, the stand 20 is provided with an upper or handle portion 37. Handle portion 37 has legs 38 which are separated from each other by a distance sufficient to provide clearance for the shank 13 of the tool, the ends 39 of the legs 38 preferably being spot welded to the upper portion of the support 21 as indicated diagrammatically in Figure 3. Thus, the stand 20 is made up of the handle portion 37 and the support 21; these parts are rigidly joined together by a bifurcated portion straddling the shank of the tool, and move as a unit about the hinge pin 25. Those skilled in the art will appreciate that, if desired, the support 21 and handle portion 27 may be integrally formed from a single stamping rather than being welded together as shown herein.

The handle portion 37 has downwardly turned flanges 40 on either side thereof for the sake of rigidity and also may be provided with a central flute or raised portion 41. The central edge 42 between legs 38 engages the upper surface of the shank 13 of the tool when the stand is in open position and thus acts as a stop to limit movement of the stand under the influence of spring 30 and to locate the support 21 in proper position to support the tool.

The upper end 43 of the handle portion 37 is preferably curved in two planes as shown so that when the support is in closed position the upper end 43 of the handle portion substantially coincides and conforms to the adjacent surface of the tool handle 15. Thus, in closed position the end 43 lies beneath the user's hand H as indicated somewhat diagrammatically in Figure 2, the arrangement being such that the handle is easily and naturally retained in closed position against the action of the spring 30 when the tool is gripped for use. In this position the support 21 is folded up against the lower surface of the shank 13, the groove or recess 45 of the support surrounding the lower portion of the shank thereby permitting the support to be raised well out of the way of the surface being operated on by the tool.

The support, when in closed position, does not interfere in any way with the use of the tool, being disposed a substantial distance from the scraping edge 11 and well above the surface to be scraped. However, as soon as the handle is released by the operator the stand 20 takes the position shown in full lines in Figure 1, the support 21 lifting and retaining the heated portion of the tool well away from the surface being worked upon, thus substantially eliminating the danger of fire or the possibility of accidental damage to the surface by the heated blade of the tool.

From the foregoing description of a preferred form of my invention it will be seen that I have provided a simple and effective stand for heated tools such as electrically heated paint removing tools. My stand functions automatically to hold the heated portion of the tool away from the surface on which the tool is resting and yet does not interfere with the convenient and normal use of the tool. My stand can be made economically from simple stampings and adds little to the bulk and weight of the tool. My stand is substantially foolproof and prevents the likelihood of damage to a supporting surface when the heated tool is not in use.

Those skilled in the art will appreciate that various changes and modifications may be made in my invention and that the invention may be adapted to tools other than the paint removing tools described herein, all without departing from the spirit and scope of my invention.

I claim:

1. In combination with a paint removing tool having an electrically heated blade at one end, a handle at the other end and a tubular shank connecting the heated portion and handle, means for holding said heated blade out of contact with a supporting surface comprising a stand pivoted on an axis extending transversely of said shank, said stand being made up of a support disposed beneath said shank and a handle portion rigidly joined to said support and disposed above said shank, said stand being movable about its pivot between an open position in which said support projects downwardly beneath said tool to support the heated blade thereof above a surface on which the tool is resting and in which said handle portion projects upwardly from said tool, and a closed position in which said support lies along said shank and in which a part of said handle portion overlies and substantially conforms to a portion of said handle, spring means tending to rotate said stand about its pivot from closed to open position, and stop means to locate said stand in open position and to limit said rotation.

2. In combination with a tool having a heated portion at one end, a handle at the other end and a shank connecting the heated portion and handle, means for holding said heated portion out of contact with a supporting surface comprising a stand pivoted on an axis extending transversely of said shank, said stand being made up of a support disposed beneath said shank and a handle portion rigidly joined to said support and disposed above said shank, said stand being movable about its pivot between an open position in which said support projects downwardly beneath said tool to support the heated portion thereof above a surface on which the tool is resting and in which said handle portion projects upwardly from said tool, and a closed position in which said support lies along the shank of the tool and in which a part of said handle portion overlies and substantially conforms to a portion of the handle of said tool, spring means tending to rotate said stand about its pivot from closed to open position, and stop means to locate said stand in open position and to limit said rotation.

3. In combination with a tool having a heated portion at one end, a handle at the other end and a shank connecting the heated portion and handle, means for holding said heated portion out of contact with a supporting surface comprising a stand pivotally mounted on said tool, said stand being made up of a support and a handle portion rigidly joined thereto, said stand being movable about its pivot between an open position in which said support projects downwardly beneath said tool to support the heated portion thereof above a surface on which the tool is resting and a closed position in which said support is disposed above the operating level of the heated portion of said tool whereby the support does not interfere with the operation of the tool and in which a part of said handle portion overlies a portion of the handle of said tool whereby said stand can be held in closed position by the hand of the user grasping the handle of the tool, and constantly acting spring means for rotating said stand about its pivot from closed to open position when said handle portion is released.

4. A stand for a tool having an electrically heated portion at one end, a handle at the other end and a shank connecting the heated portion and handle, said stand being adapted to hold said heated portion out of contact with a supporting surface and comprising a support, a handle portion joined thereto and a pivot for mounting said stand on said tool, said stand being movable about its pivot between an open position in which said support projects downwardly beneath said tool to support the heated portion thereof above a surface on which the tool is resting and a closed position in which said support is disposed above the operating level of the heated portion of said tool whereby the support does not interfere with the operation of the tool and in which a part of said handle portion overlies a portion of the handle of said tool whereby said stand can be held in closed position by the hand of the user grasping the handle of the tool, and constantly acting spring means for rotating said stand about its pivot from closed to open position when said handle portion is released.

5. A stand according to claim 4, wherein said pivot is disposed beneath the shank of the tool in a position such that the weight of the tool on the handle side of the point of engagement of the support with the surface on which the tool is resting overbalances the weight of the tool on the other side of said point whereby said tool will rest on said handle and said support when said stand is in open position.

6. A stand according to claim 5 wherein the spring means comprises a helical spring surrounding the pivot pin and acts between the stand and a portion of the tool.

7. A stand according to claim 6 wherein the stop means for limiting the rotation of the stand comprises a portion of the handle which is adapted to engage the shank of the tool when the stand is in open position.

8. A stand according to claim 4, wherein said support is disposed beneath the shank of the tool and said handle portion is disposed above said shank, said handle portion and said shank being joined by a bifurcated portion straddling the shank of the tool.

9. A stand according to claim 4 wherein said support has a central groove which conforms to the shank of the tool when the stand is in closed position.

ROBERT H. GREEN.

References Cited in the file of this patent

UNITED STATES PATENTS

| Number | Name | Date |
|---|---|---|
| 382,060 | Steigleder | May 1, 1888 |
| 490,430 | Feicker | Jan. 24, 1893 |
| 674,344 | Rising | May 14, 1901 |
| 1,988,827 | Bennett | Jan. 22, 1935 |
| 2,056,951 | Bohall et al. | Oct. 13, 1936 |
| 2,086,102 | Stradling | July 6, 1937 |

FOREIGN PATENTS

| Number | Country | Date |
|---|---|---|
| 963 | Great Britain | Feb. 21, 1883 |
| 419,890 | Germany | Oct. 12, 1925 |